(12) United States Patent
Kumazaki et al.

(10) Patent No.: US 12,422,823 B2
(45) Date of Patent: Sep. 23, 2025

(54) WORKPIECE MACHINING DEVICE

(71) Applicant: FUJI CORPORATION, Chiryu (JP)

(72) Inventors: Shinya Kumazaki, Toyota (JP);
Masashi Ogawa, Toyota (JP)

(73) Assignee: FUJI CORPORATION, Chiryu (JP)

( * ) Notice: Subject to any disclaimer, the term of this patent is extended or adjusted under 35 U.S.C. 154(b) by 451 days.

(21) Appl. No.: 17/996,979

(22) PCT Filed: May 30, 2020

(86) PCT No.: PCT/JP2020/021501
§ 371 (c)(1),
(2) Date: Oct. 24, 2022

(87) PCT Pub. No.: WO2021/245717
PCT Pub. Date: Dec. 9, 2021

(65) Prior Publication Data
US 2023/0176546 A1 Jun. 8, 2023

(51) Int. Cl.
*G05B 19/4155* (2006.01)
*B23Q 15/12* (2006.01)

(52) U.S. Cl.
CPC ......... *G05B 19/4155* (2013.01); *B23Q 15/12* (2013.01); *G05B 2219/33099* (2013.01)

(58) Field of Classification Search
None
See application file for complete search history.

(56) References Cited

U.S. PATENT DOCUMENTS

2014/0257717 A1* 9/2014 Kumazaki .......... B23Q 17/0961
702/35
2014/0365177 A1* 12/2014 Kumazaki .......... B23Q 17/0961
702/183

FOREIGN PATENT DOCUMENTS

JP 7-24694 A 1/1995
JP 2007-52797 A 3/2007
(Continued)

OTHER PUBLICATIONS

International Search Report mailed on Aug. 18, 2020 in PCT/JP2020/021501 filed on May 30, 2020 (3 pages).

*Primary Examiner* — Ryan A Jarrett
(74) *Attorney, Agent, or Firm* — Oblon, McClelland, Maier &Neustadt, L.L.P.

(57) ABSTRACT

A workpiece machining device for executing machining of a workpiece using a machining tool, including a detection section configured to detect a detectable physical amount which is a physical amount relating to the machining of the workpiece and which can be detected at each of detection points which are set at predetermined intervals in a monitoring range for monitoring a state of the detectable physical amount, a storage device configured to store machining data which is actual detection data which is actually detected by the detection section, a group forming section configured to form one or multiple groups by dividing the actual detection data stored in the storage device in accordance with the number of the detection points which are set in advance in an interval from a monitoring start point to a monitoring end point of the monitoring range, and a setting section configured to set an upper limit value and a lower limit value of the monitoring range for each group of the groups formed by the group forming section based on the actual detection data belonging to each group.

2 Claims, 13 Drawing Sheets

(56) References Cited

FOREIGN PATENT DOCUMENTS

| | | |
|---|---|---|
| JP | 2009-285792 A | 12/2009 |
| JP | WO 2013/108435 A1 | 7/2013 |
| JP | 2014-172102 A | 9/2014 |
| WO | WO 2013/108435 A1 | 7/2013 |
| WO | WO 2014/068644 A1 | 5/2014 |
| WO | WO 2020/021044 A1 | 1/2020 |

\* cited by examiner

WORKPIECE MACHINING DEVICE

TECHNICAL FIELD

The present description relates to a workpiece machining device.

BACKGROUND ART

As one form of a workpiece machining device, Patent Literature 1 discloses a tool abnormality determination system which can easily improve the precision of a monitoring range. In this tool abnormality determination system, an upper limit threshold value (an upper limit value) of the monitoring range is set based on a high load side peak hold value, a difference between a low load side peak hold value and the high load side peak hold value (a peak hold difference), and an offset amount. In addition, a lower limit threshold value (a lower limit value) of the monitoring range is set based on the low load side peak hold value, the peak hold difference, and the offset amount.

PATENT LITERATURE

Patent Literature 1: JP-A1-2013/108435 (International Publication No. 2013/108435)

SUMMARY OF THE INVENTION

Technical Problem

Although the upper and lower limit values of the monitoring range can be set in the workpiece machining device described in Patent Literature 1 described above, there is a demand for setting the upper and lower limit values more easily.

In view of these situations, the present description discloses a workpiece machining device which can enable upper and lower limit values of a monitoring range to be set more easily.

Solution to Problem

The present description discloses a workpiece machining device for executing machining of a workpiece using a machining tool, comprising: a detection section configured to detect a detectable physical amount which is a physical amount relating to the machining of the workpiece and which can be detected at each of detection points which are set at predetermined intervals in a monitoring range for monitoring a state of the detectable physical amount; a storage device configured to store machining data which is actual detection data which is actually detected by the detection section; a group forming section configured to form one or multiple groups by dividing the actual detection data stored in the storage device in accordance with the number of detection points which are set in advance in an interval from a monitoring start point to a monitoring end point of the monitoring range; and a setting section configured to set an upper limit value and a lower limit value of the monitoring range for each group of the groups formed by the group forming section based on the actual detection data belonging to each group.

Advantageous Effect of the Invention

With the present disclosure, the upper limit value and the lower limit value of the monitoring range can be set for each group of the groups formed in accordance with the number of detection points which are set in advance in the interval from the monitoring start point to the monitoring end point of the monitoring range. That is, the upper and lower limit values of the monitoring range can be set based on the number of detection points and the actual detection data from the monitoring start point to the monitoring end point of the monitoring range. Therefore, the upper and lower limit values of the monitoring range can be set more easily in the workpiece machining device.

DESCRIPTION OF EMBODIMENTS (Machining System)

Figure 1:
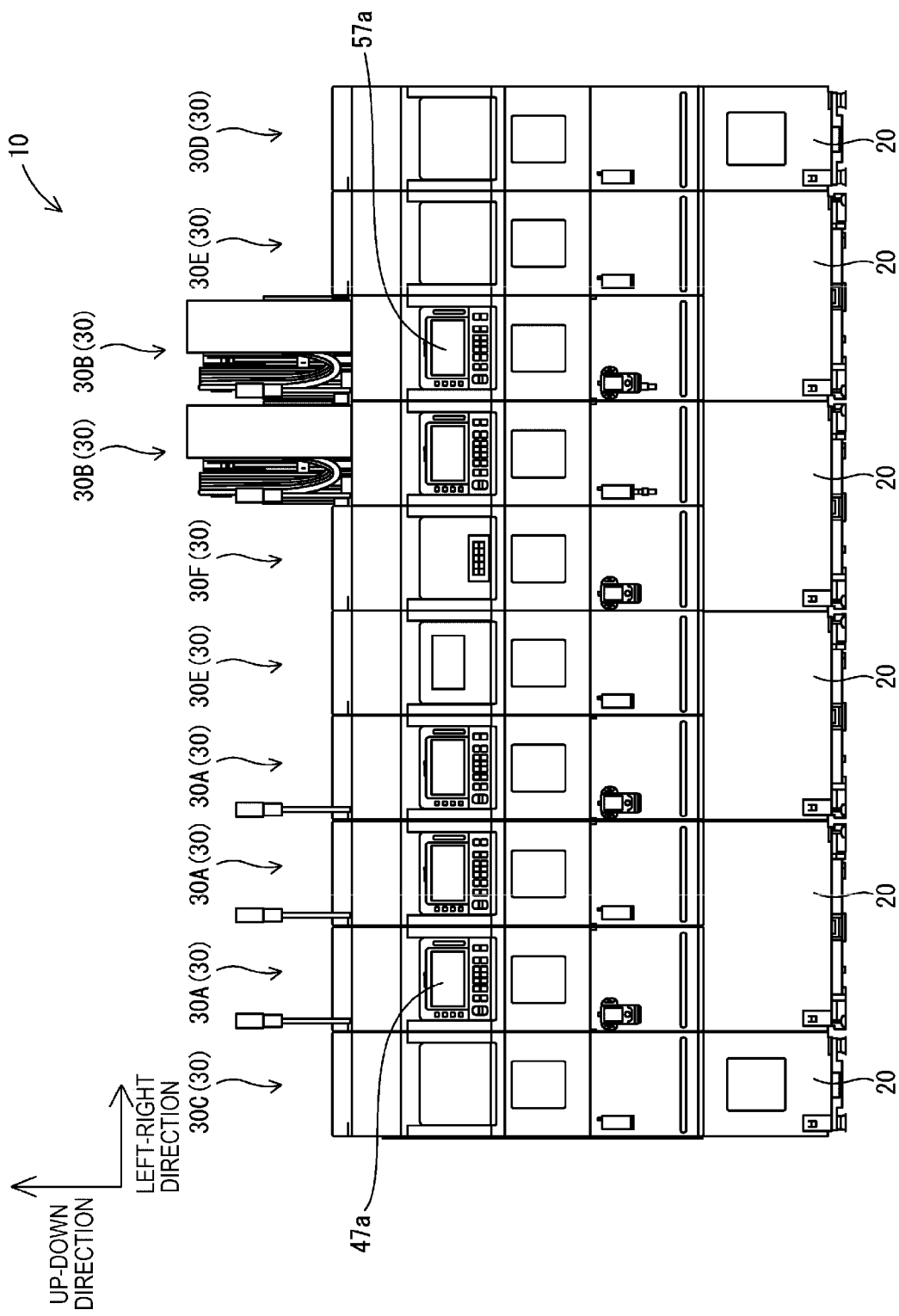
FIG. 1 is a front view showing machining system 10 to which a workpiece machining device is applied.

Hereinafter, one embodiment will be described which constitutes one example of a machining system to which a workpiece machining device is applied. As shown in FIG. 1, machining system (line production facility) 10 includes multiple base modules 20, multiple (10 in the present embodiment) work machine modules 30 which are provided on those base modules 20, and articulated robot (hereinafter, will also be referred to simply as a robot depending on cases) 70 (refer, for example, to FIG. 2). Machining system 10 is made up of multiple modules (base modules 20 and work machine modules 30) which are positioned in a row to machine workpiece W with tools. In the following description, when directions of machining system 10 are referred to using "front", "rear", "left", "right", "up", and "down", the directions denote front, rear, left, right, up, and down respectively when machining system 10 is viewed from a front side thereof.

Base module 20 includes robot 70, which is a workpiece conveyance device, and a robot control device (not shown) for controlling robot 70. Robot 70 has a manipulation function so as to releasably hold workpiece W for conveyance and has a moving (self-traveling) function so as to move while holding workpiece W.

There are multiple types of work machine modules 30, including lathe module 30A, drilling-milling module 30B, pre-machining stock module 30C, post-machining stock module 30D, inspection and measurement module 30E, temporary placement module 30F, and the like.

(Lathe Module)

Figure 2:
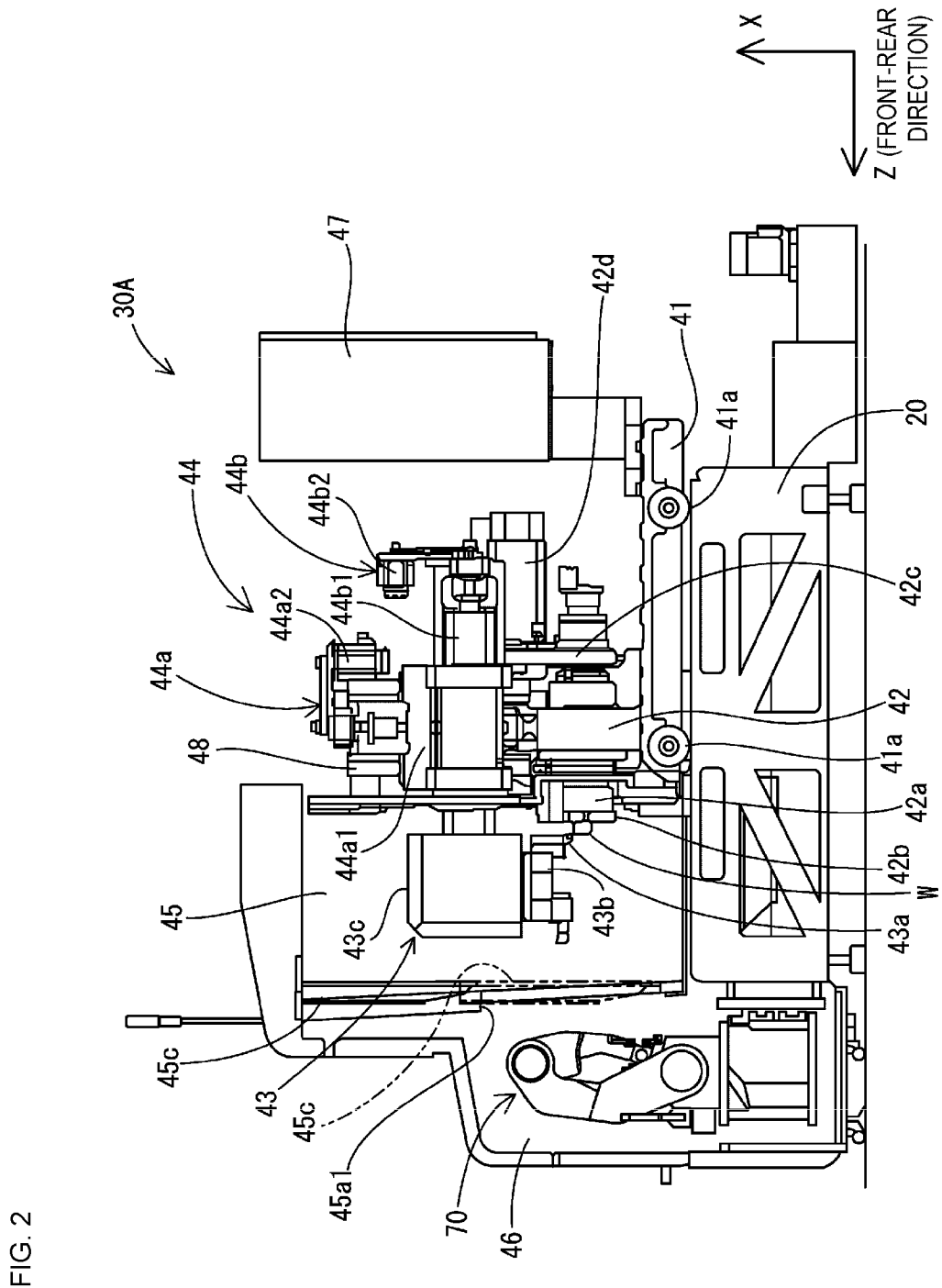
FIG. 2 is a side view showing lathe module 30A shown in FIG. 1.

Lathe module 30A is a modularized lathe. The lathe is a "workpiece machining device" for machining workpiece W, which is a machining target, with fixed cutting tool 43a by rotating relevant workpiece W. Cutting tool 43a is a "machining tool" for machining workpiece W. The workpiece machining device can execute machining of workpiece W using cutting tool 43a (the machining tool) by following machining steps (a machining program). As shown in FIG. 2, lathe module 30A includes movable bed 41, main spindle stand 42, tool stand 43, tool stand moving device 44, machining chamber 45, traveling chamber 46, and module control device 47 (hereinafter, also referred to simply as control device 47 depending on cases).

Movable bed 41 moves on a rail (not shown) provided on base module 20 via multiple wheels 41a along a front-rear direction. Main spindle stand 42 rotatably holds workpiece W. Main spindle stand 42 rotatably supports main spindle 42a which is disposed horizontally along the front-rear direction. Chuck 42b, which is configured to hold workpiece W, is provided at a distal end portion of main spindle 42a. Main spindle 42a is driven to rotate by servo motor 42d via rotation transmission mechanism 42c. A current (a driving current) for servo motor 42d is detected by current sensor 42e (refer to FIG. 3), and a detection result is output to control device 47, which will be described later.

Tool stand 43 is a device for providing a feeding motion to cutting tool 43a. Tool stand 43 is a so-called turret-type tool stand, and has tool holding section 43b on which multiple cutting tools 43a for cutting workpiece W are mounted, and rotational driving section 43c for rotatably supporting tool holding section 43b and positioning relevant tool holding section 43b in a predetermined position.

Tool stand moving device 44 is a device for moving tool stand 43 and hence cutting tools 43a along an up-down direction (an X-axis direction) and the front-rear direction (a Z-axis direction). Tool stand moving device 44 has an X-axis driving device 44a for moving tool stand 43 along the X-axis direction, and a Z-axis driving device 44b for moving tool stand 43 along the Z-axis direction.

X-axis driving device 44a has X-axis slider 44a1, which is attached to column 48 provided on movable bed 41 in such a manner as to slide thereon along the up-down direction, and servo motor 44a2 for moving X-axis slider 44a1. Z-axis driving device 44b has Z-axis slider 44b1, which is attached to X-axis slider 44a1 in such a manner as to slide thereon along the front-rear direction, and servo motor 44b2 for moving Z-axis slider 44b1. Tool stand 43 is attached to Z-axis slider 44b1. A current (a driving current) for servo motor 44a2 is detected by current sensor 44a3 (refer to FIG. 3), and a detection result is output to control device 47, which will be described later. A current (a driving current) for servo motor 44b2 is detected by current sensor 44b3, and a detection result is output to control device 47, which will be described later.

Machining chamber 45 is a chamber (space) where to machine workpiece W, and an inlet/outlet port 45a1 of machining chamber 45 is opened and closed by shutter 45c which is driven by a motor (not shown), whereby workpiece W held by robot 70 is let in and out of machining chamber 45 through inlet/outlet port 45a1. Here, an open state (an open position) of shutter 45c is indicated by solid lines, and a closed state (a closed position) thereof is indicated by chain double-dashed lines. Traveling chamber 46 is a chamber (space) provided so as to face inlet/outlet port 45a1 of machining chamber 45. Robot 70 can travel inside traveling chamber 46.

(Module Control Device, Input/Output Device, and the Like)

Figure 3:
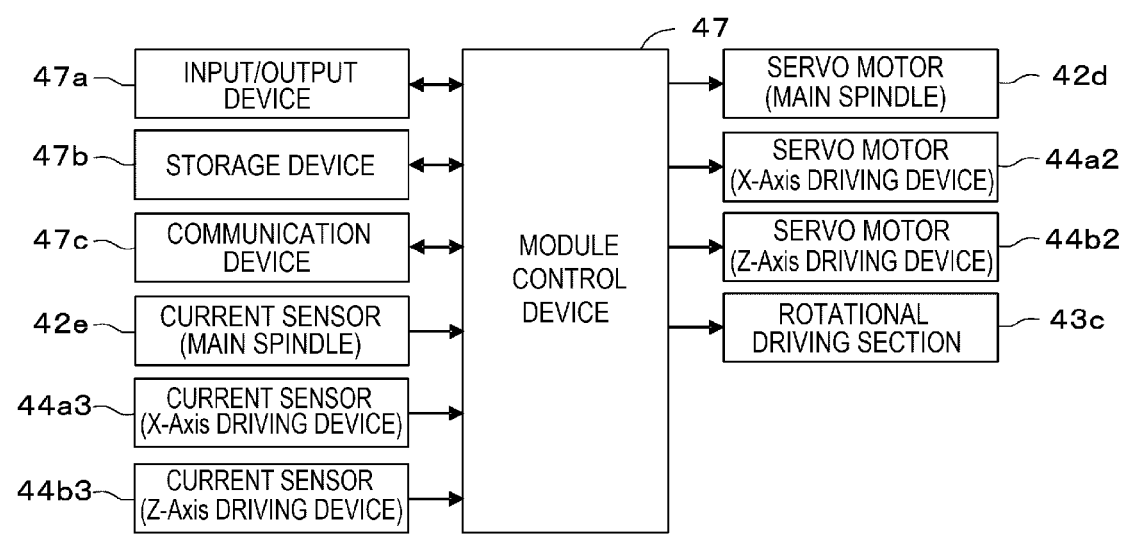
FIG. 3 is a block diagram showing lathe module 30A.

Control device (module control device) 47 is a control device for drive controlling main spindle 42a, rotational driving section 43c, tool stand moving device 44, and the like. As shown in FIG. 3, control device 47 is connected to input/output device 47a, storage device 47b, communication device 47c, rotational driving section 43c, current sensors 42e, 44a3, 44b3, and servo motors 42d, 44a2, 44b2. Control device 47 has a microcomputer (not shown), and the microcomputer includes an input/output interface, CPU, RAM, and ROM (all are not shown) which are connected to one another via a bus. The CPU executes various programs not only to acquire data from input/output device 47a, storage device 47b, communication device 47c, and current sensors 42e, 44a3, 44b3 but also to control input/output device 47a, main spindle 42a (servo motor 42d), rotational driving section 43c, and tool stand moving device 44 (servo motors 44a2 and 44b2). The RAM is designed to temporarily store variables necessary for executing the same programs, and the ROM is designed to temporarily stores the programs.

As shown in FIG. 1, input/output device 47a is provided on a front surface of work machine module 30, and is designed not only to enable an operator to input various types of settings, various types of instructions, and the like into control device 47 (as an input device) but also to display information on an operation status, a maintenance status, and the like for the operator (as an output device). Input/output device 47a is a device such as a human machine interface (HMI), a man machine interface, and the like with which a human and a machine exchange information therebetween.

Figure 4:
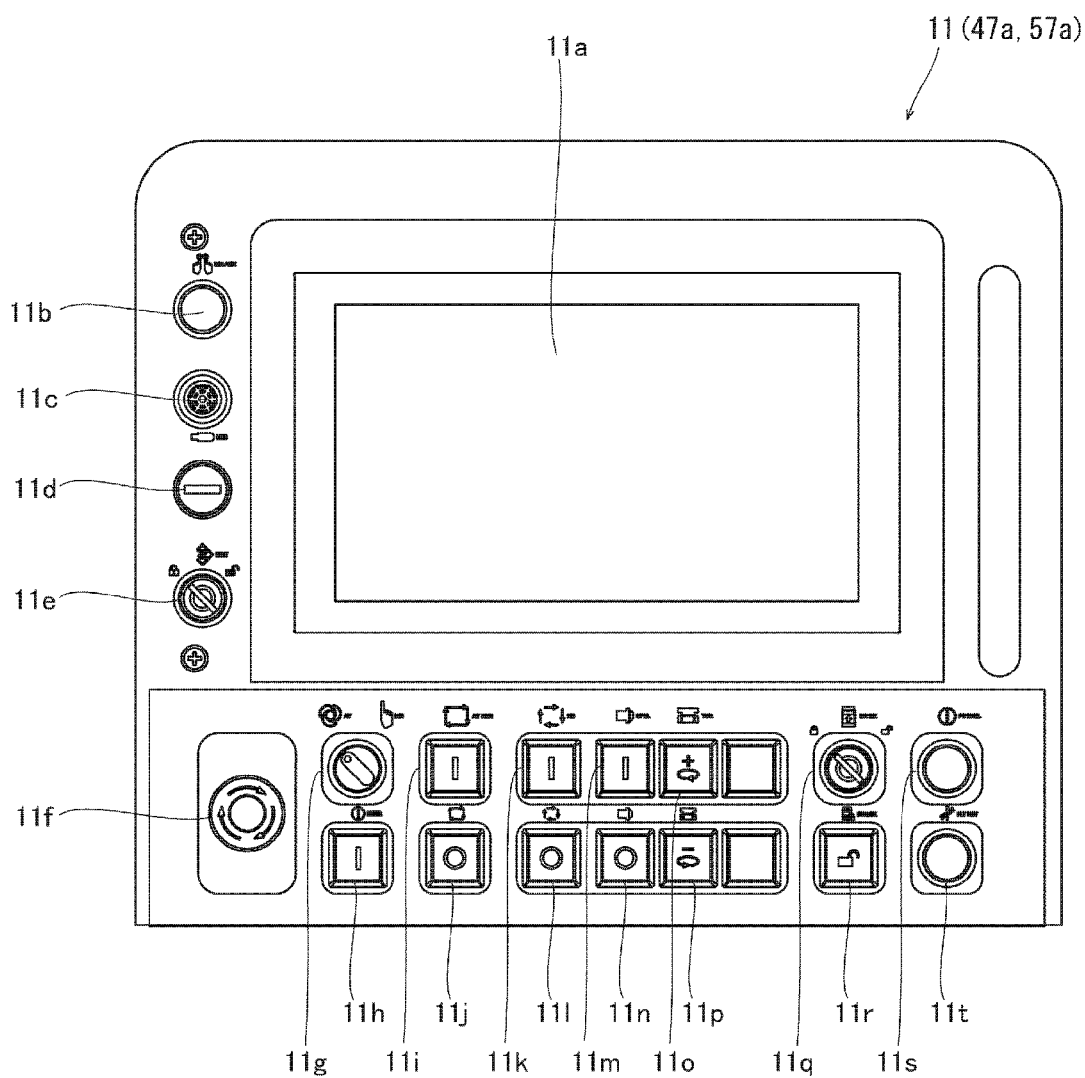
FIG. 4 is a front view showing an input/output device.

Input/output device 47a is input/output device 11 shown in FIG. 4. Input/output device 11 includes display panel 11a, individual operation assist button 11b, alarm buzzer 11c, USB insertion port 11d, editing enablement/disablement selection key 11e, emergency stop button 11f, automatic/individual selection switch 11g, operation preparation button 11h, automatic activation button 11i, continuous cut-off button 11j, NC activation button 11k, NC temporary stop button 11l, main spindle activation button 11m, main spindle stop button 11n, turret forward rotation button 11o, turret reverse rotation button 11p, door interlocking selection key 11q, door unlocking button 11r, execution button 11s, and abnormality resetting button 11t.

Display panel 11a is a touch panel type monitor for displaying various pieces of information. USB insertion port 11d is a port into which USB is inserted when data is input and output. Editing enablement/disablement key 11e is used when an editing operation is performed to edit data such as a machining program, parameters, and the like (for example, a load monitoring range) which are stored in storage devices 47b, 57b, and a storage device inside the control device. When selection key 11e is situated in a left position, an editing operation is disabled, whereas when selection key 11e is positioned in a right position, an editing operation is enabled. Here, the configuration of input/output device 57a of drilling-milling module 30B is almost the same as the configuration of input/output device 47a of lathe module 30A, although the former is slightly different from the latter in terms of switches/buttons.

(Display Panel)

Figure 5:
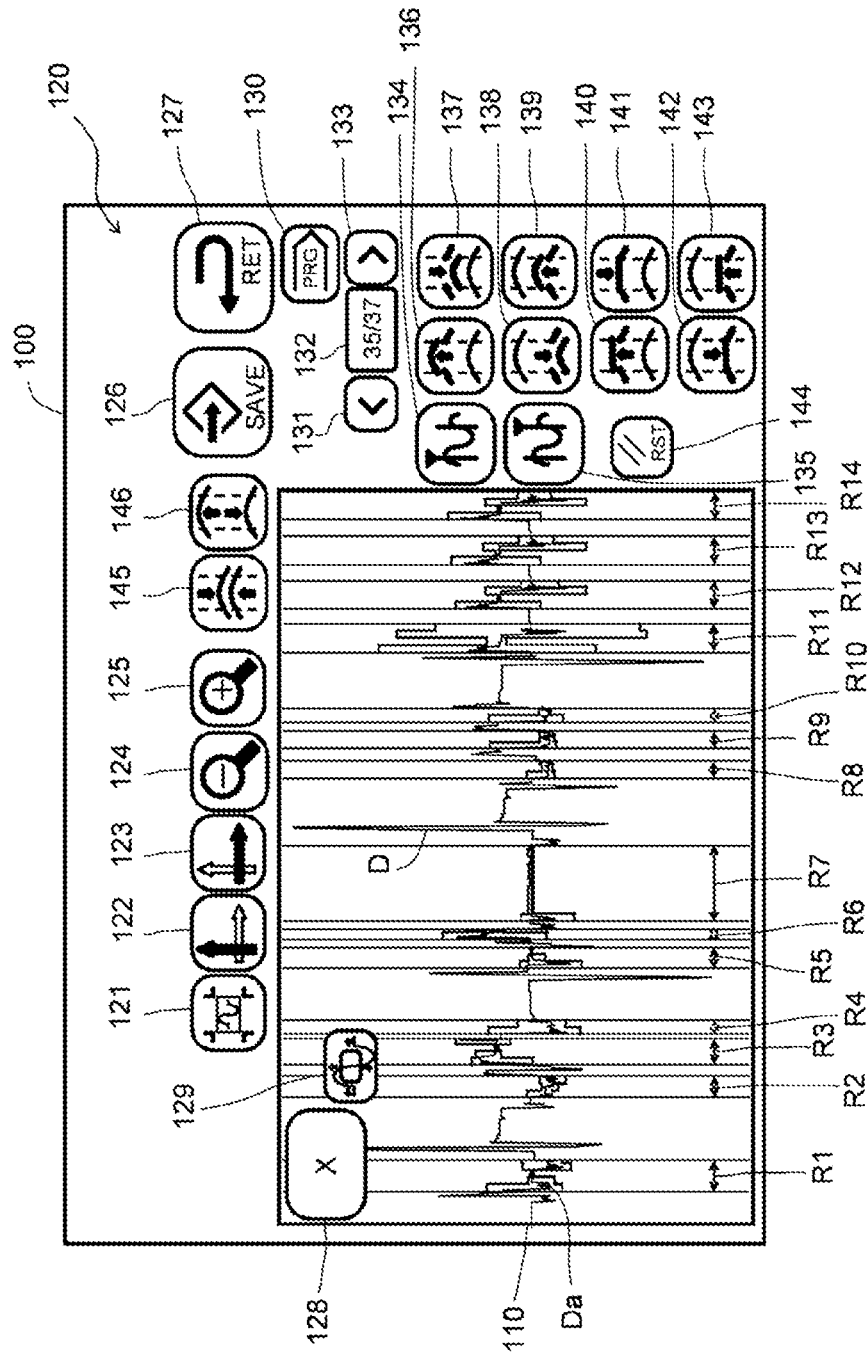
FIG. 5 is a diagram showing an upper and lower limit value adjustment screen.

An upper and lower limit values adjustment screen 100 shown in FIG. 5 can be displayed on display panel 11a. Upper and lower limit values adjustment screen 100 displays thereon data display section 110 for displaying load data and operation section 120 for adjusting a load monitoring range (upper and lower limit values of the monitoring range) of the load data. Operation section 120 includes individual operation keys 121 to 146, which will be described later, with which an operator can perform input operations.

Waveform display key 121 is a key for displaying an overall waveform of load data. Vertical axis key 122 is a key for reflecting scaling up or down of the display of the waveform of the load data on a vertical axis. Horizontal axis key 123 is a key for reflecting scaling up or down of the display of the waveform of the load data on a horizontal axis. Display scale-down key 124 is a key for scaling down the display of the waveform of the load data. Display scale-up key 125 is a key for scaling up the display of the waveform of the load data. Save key 126 is a key for saving a change in the load monitoring range of the load data. Return key 127 is a key for returning the current screen of data display section 110 to the previous screen (immediately previous screen) or for returning the current operation to the immediately previous operation.

Display axis selection key 128 is a key for selecting an axis on which load data is displayed (or on which the operator wants to adjust the monitoring range). When used herein, an "axis" denotes a drive axis along which the workpiece machining device is drive controlled to machine workpiece W, and for example, with lathe module 30A, the axis denotes the X-axis which constitutes the drive axis of cutting tool 43a in the up-down direction, the Z-axis which constitutes the drive axis of cutting tool 43a in the front-rear direction, and the axis of main spindle 42a which rotatably supports workpiece W. Display position moving key 129 is a key for moving a display position (a display frame) to a desired location (for example, a monitoring range) of a series of load data which the operator wants to display.

Program display key 130 is a key for displaying a machining program on data display section 110 in place of or together with the load data. Monitoring range leftward moving key 131 is a key for moving the monitoring range of load data which constitutes an editing target (a changing target) in a leftward direction so as to be edited (changed). Currently selected monitoring range display dialog 132 is a key for displaying a dialog which displays a location (a monitoring location) of the monitoring range which is currently selected for editing. This dialog can display the order of currently selected (edited) monitoring ranges and a total number of monitoring ranges in the machining program. Monitoring range rightward moving key 133 is a key for moving the monitoring range of load data which constitutes an editing target in a rightward direction for editing.

Adjustment (editing) range start position designation key 134 is a key for designating a start position of a range (an adjustment range) where to edit (adjust) an upper limit value and/or a lower limit value thereof in a monitoring range of load data which constitutes an editing (adjustment) target. Adjustment (editing) range end position designation key 135 is a key for designating an end position of a range (adjustment range) where to edit (adjust) an upper limit value and/or a lower limit value thereof in a monitoring range of load data which constitutes an editing (adjustment) target. A range which is defined by the start position and the end position, which are designated as described above, is also referred to as a designation range.

Upper limit value scale-up key 136 is a key for scaling up the upper limit value of the adjustment range (the designation range) (in other words, scaling up the upper limit value along an up-down direction of the screen). In this case, an upper limit value after changing (adjusting) the designation range constitutes a value resulting from translating upwards the upper limit value before changing (adjusting) the designation range, and the operator can set arbitrarily an amount of such an upward translation. Upper limit value scale-down key 137 is a key for scaling down the upper limit value of the adjustment range (the designation range) (in other words, scaling down the upper limit value along the up-down direction of the screen). In this case, an upper limit value resulting after changing the designation range constitutes a value resulting from translating downwards the upper limit value before changing the designation range, and the operator can set arbitrarily an amount of such a downward translation.

Lower limit value scale-up key 138 is a key for scaling up the lower limit value of the adjustment range (the designation range) (in other words, scaling up the lower limit value along the up-down direction of the screen). In this case, a lower limit value after changing the designation range constitutes a value resulting from translating downwards the lower limit value before changing the designation range, and the operator can set arbitrarily an amount of such a downward translation. Lower limit value scale-down key 139 is a key for scaling down the lower limit value of the adjustment range (the designation range) (in other words, scaling down the lower limit value along the up-down direction of the screen). In this case, a lower limit value after changing the designation range constitutes a value resulting from translating upwards the lower limit value before changing the designation range, and the operator can set arbitrarily an amount of such an upward translation.

Upper limit value maximization key 140 is a key for scaling up the upper limit value of the adjustment range (the designation range) to a maximum value within the designation range (in other words, for unifying the upper limit value to the maximum value thereof). In this case, an upper limit of the designation range can be made flat at the maximum value within the designation range. Here, the upper limit value may be scaled up not to the maximum value within the designation range but to an arbitrary value which is a value larger than the maximum value within the designation range (for example, a value less than a maximum value that the load data can take). Upper limit value minimization key 141 is a key for scaling down the upper limit value of the adjustment range (the designation range) to a minimum value within the designation range (in other words, for unifying the upper limit value to the minimum value thereof). In this case, the upper limit of the designation range can be made flat at the minimum value within the designation range. Here, the upper limit value may be scaled down not to the minimum value within the designation range but to an arbitrary value which is a value smaller than the minimum value within the designation range (for example, a value larger than the lower limit value of the designation range).

Lower limit value minimization key 142 is a key for scaling down the lower limit value of the adjustment range (the designation range) to a minimum value within the designation range (in other words, for unifying the lower limit value to the minimum value thereof). In this case, a lower limit of the designation range can be made flat at the minimum value within the designation range. Here, the lower limit value may be scaled down not to the minimum value within the designation range but to an arbitrary value which is a value smaller than the minimum value within the designation range (for example, a value larger than 0 (zero)). Lower limit value maximization key 143 is a key for scaling up the lower limit value of the adjustment range (the designation range) to a maximum value within the designation range (in other words, for unifying the lower limit value to the maximum value thereof). In this case, the lower limit of the designation range can be made flat at the maximum value within the designation range. Here, the lower limit value may be scaled up not to the maximum value within the designation range but to an arbitrary value which is a value larger than the maximum value within the designation range (for example, a value smaller than the upper limit value of the designation range).

Resetting key 144 is a key for resetting the editing operation. When referred to herein, a key denotes a switch or a push button.

Resolution scale-down key 145 is a key for making sharp (high) a sensitivity which is a degree or an extent at which a machining state of a workpiece is detected, and is a key for reducing a resolution associated with the sensitivity. The resolution denotes a degree of input and output of actual data into and from upper and lower limit ranges of the monitoring range, and the smaller the resolution, the higher the sensitivity, that is, the upper and lower limit ranges are set narrower with respect to the actual data. On the contrary, the higher the resolution, the lower the sensitivity, that is, the upper and lower limit ranges are set wider with respect to the actual data.

When used herein, the "resolution" is defined by the number of machining points (machining point number) which make up a group, that is, the resolution is defined by a machining point number per group. For example, in the case that the resolution is "1", the machining point number per group is "1" (refer to FIG. 11), in the case that the resolution is "3", the machining point number per group is "3" (refer to FIG. 12), and in the case that the resolution is "5", the machining point number per group is "5" (refer to FIG. 13).

Since the machining points are disposed at regular intervals, as the machining point number increases, a length of one group (a group length) increases, whereby the resolution is increased. On the other hand, as the machining point number decreases, the length of one group (the group length) decreases, whereby the resolution is decreased or scaled down. Here, the "resolution" is also referred to as a degree of precision at which the monitoring range (the monitoring section) is subdivided by dividing the monitoring range into groups. The "group" is a group of machining points for detecting load data which is used to set upper and lower limit values for the monitoring range.

Resolution scale-up key 146 is a key for making the sensitivity dull and is a key for scaling up the resolution. Here, a configuration may be adopted in which a resolution setting key (not shown) is provided in place of providing resolution scale-down key 145 and resolution scale-up key 146. The resolution setting key is a key for setting a resolution. When the resolution setting key is turned on, a quantity (a value) of resolution can be input into a resolution input area on a display screen where to input a quantity of resolution. Here, a quantity of resolution can be input with an input key (not shown). In addition, the resolution setting key can also be used to individually set (adjust) a resolution for a monitoring axis (an axis as a monitoring target) and a monitoring location (a location as a monitoring target) which is designation as such an axis and a location. In this case, the resolution setting key functions as an individual adjustment resolution setting key. On the other hand, the resolution setting key can also be used to collectively set (adjust) resolutions for all the monitoring axes and all the monitoring locations without designating monitoring axes and monitoring locations. In this case, the resolution setting key functions as a collective adjustment resolution setting key.

Storage device 47b stores data associated with control of lathe module 30A including, for example, a control program (a machining program), parameters for use in the control program, data relating to various settings and various instructions, load data (machining data), and the like. Communication device 47c is a device for performing a mutual communication with other modules within the same machining system, a mutual communication with a different machining system, or a mutual communication with an integration computer for integrating and managing multiple machining systems via Internet (or a local area network (LAN)).

(Drilling-Milling Module)

Figure 6:
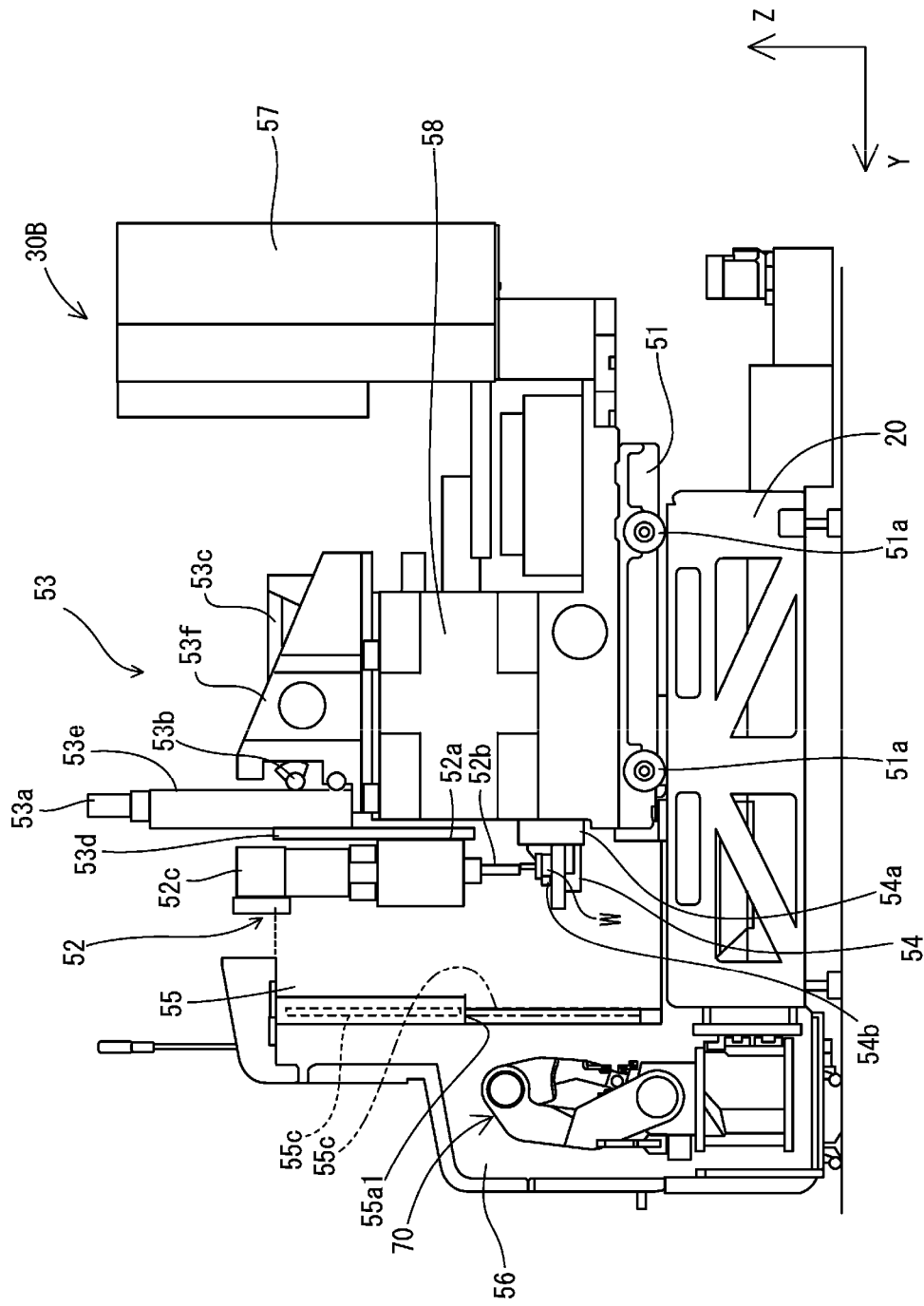
FIG. 6 is a side view showing drilling-milling module 30B shown in FIG. 1.

Drilling-milling module 30B is a modularized machining center that executes drilling with a drill, milling, and the like. The machining center is a "workpiece machining device" for machining fixed workpiece W by pressing a rotating tool (a rotational tool) against relevant workpiece W. As shown in FIG. 6, drilling-milling module 30B has movable bed 51, main spindle head 52, main spindle head moving device 53, workpiece table 54, machining chamber 55, traveling chamber 56, and module control device 57 (in the present description, also referred to simply as control device 57 depending on cases).

Movable bed 51 moves along the front-rear direction on a rail (not shown) provided on base module 20 via multiple wheels 51a. Main spindle head 52 rotatably supports main spindle 52a. Cutting tool 52b (for example, a drill, an end mil, or the like) for cutting workpiece W can be attached to a distal end (lower end) portion of main spindle 52a via a main spindle chuck. Main spindle 52a is rotationally driven by servo motor 52c. The main spindle chuck clamps/unclamps cutting tool 52b. A current (a driving current) for servo motor 52c is detected by current sensor 52d (refer to FIG. 7), and a detection result is output to control device 57, which will be described later. Cutting tool 52b is a "machining tool" for machining workpiece W.

Main spindle head moving device 53 is a device for moving main spindle head 52 and hence cutting tool 52b along the up-down direction (a Z-axis direction), the front-rear direction (a Y-axis direction), and the left-right direction (an X-axis direction). Main spindle head moving device 53 has Z-axis driving device 53a for moving main spindle head 52 along the Z-axis direction, X-axis driving device 53b for moving main spindle head 52 along the X-axis direction, and Y-axis driving device 53c for moving main spindle head 52 along the Y-axis direction. Z-axis driving device 53a moves Z-axis slider 53d, which is slidably attached to X-axis slider 53e, along the Z-axis direction. Main spindle head 52 is attached to Z-axis slider 53d. X-axis driving device 53b moves X-axis slider 53e, which is slidably attached to Y-axis slider 53f, along the X-axis direction. Y-axis driving device 53c moves Y-axis slider 53f, which is slidably attached to main body 58 provided on movable bed 51, along the Y-axis direction. Z-axis driving device 53a, X-axis driving device 53b, and Y-axis driving device 53c function using built-in servo motors 53a1, 53b1, 53c1, respectively, as a drive source (refer to FIG. 7). Currents (driving currents) for servo motors 53a1, 53b1, 53c1 are detected by corresponding current sensors 53a2, 53b2, 53c2, respectively (refer to FIG. 7), and detection results are output to control device 57, which will be described later.

Workpiece table 54 fixedly holds workpiece W via chuck 54b. Workpiece table 54 is fixed to workpiece table rotating device 54a, which is provided on a front surface of main body 58. Workpiece table rotating device 54a is rotationally driven around an axis extending along the front-rear direction.

Machining chamber 55 is a chamber (space) for machining workpiece W, and inlet/outlet port 55a1 of machining chamber 55 is opened and closed by shutter 55c, which is driven by a motor (not shown), so as to enable workpiece W held by robot 70 to be let in and out of processing chamber 55. Traveling chamber 56 is a chamber (space) which is provided in such a manner as to face inlet/outlet port 55a1 of machining chamber 55. Robot 70 can travel within traveling chamber 56. Here, adjacent traveling chambers 46 (or 56) form a space which continues along a full length of machining systems 10 in a direction in which workpiece machining devices are provided side by side.

(Module Control Device, Input/Output Device, and the Like)

Figure 7:
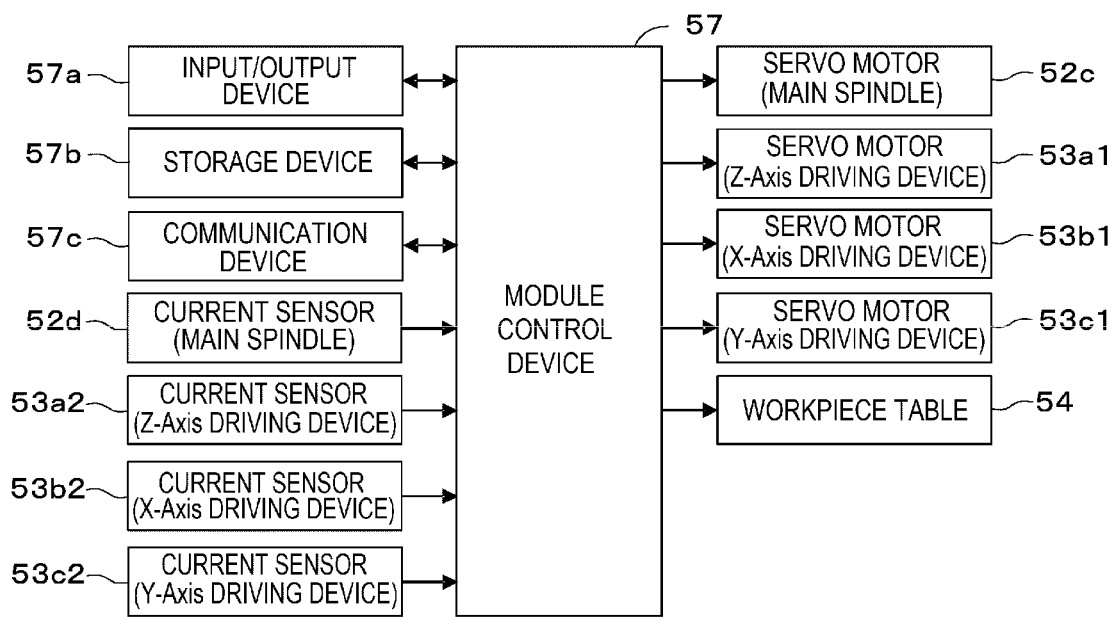
FIG. 7 is a block diagram showing drilling-milling module 30B.

Control device (module control device) 57 is a control device for drive controlling main spindle 52a, main spindle head moving device 53, and the like. As shown in FIG. 7, control device 57 is connected to input/output device 57a, storage device 57b, communication device 57c, workpiece table 54, current sensors 52d, 53a2, 53b2, 53c2, and servo motors 52c, 53a1, 53b1, and 53c1. Control device 57 includes a microcomputer (not shown), and the microcomputer includes an input/output interface, CPU, RAM, and ROM (all not shown) that are connected to each other via a bus. CPU executes various programs not only to acquire data from input/output device 57a, storage device 57b, communication device 57c, and current sensors 52d, 53a2, 53b2, 53c2 but also to control input/output device 57a, main spindle 52a (servo motor 52c), and main spindle head moving device 53 (servo motors 53a1, 53b1, 53c1). The RAM is designed to temporarily store variables necessary for executing the same programs, and the ROM is designed to temporarily stores the programs.

As shown in FIG. 1, input/output device 57a is provided on a front surface of work machine module 30 and functions in a similar manner to the manner in which input/output device 47a functions. Storage device 57b stores data associated with control of drilling-milling module 30B including, for example, a control program (a machining program), parameters for use in the control program, data involved in various settings and various instructions, load data (machining data), and the like. Communication device 57c is a device similar to communication device 47c.

(Stock Modules, Inspection and Measurement Module, and the Like)

Pre-machining stock module 30C is a module for loading workpiece W into machining system 10 (a workpiece loading module). Post-machining stock module 30D is a module for receiving therein and discharging a completed product which is completed as a result of machining system 10 having completed a series of machining steps on workpiece W (workpiece discharging module). Inspection and measurement module 30E is a device (a measurement device) for inspecting and measuring (measuring) workpiece W which is machined upstream (for example, workpiece W being machined or having been machined). Temporary placement module 30F is a module where to temporarily place workpiece W during the series of machining steps performed by machining system 10. Inspection and measurement module 30E and temporary placement module 30F each have a traveling chamber (not shown) as with lathe module 30A and drilling-milling module 30B.

(Workpiece Machining)

Further, machining (cutting) of workpiece W by the workpiece machining device (lathe module 30A) described above will be described along a flowchart shown in FIG. 8. Control device 47 executes processing operations along the present flowchart.

In step S102, control device 47 determines whether there has been issued an instruction to start machining new workpiece W (a predetermined quantity) in lathe module 30A. If a machining program for machining workpiece W has newly been started, control device 47 determines that there has been issued an instruction to start machining workpiece W ("YES" in step S102) and advances the program to step S104. If a machining program for machining workpiece W has not newly been started, control device 47 determines that there has been issued no instruction to start machining workpiece W ("NO" in step S102) and repeats the determination processing in step S102 until an instruction to start machining workpiece W is issued.

In step S104, control device 47 determines whether there has been issued an instruction to end the machining of workpiece W (the predetermined quantity) which has been started before. If the machining program ends machining all the predetermined quantity of workpieces W, control device 47 determines that there has been issued an instruction to end machining workpiece W ("YES" in step S104) and ends the present flowchart. If the machining program has not ended, control device 47 determines that there has been issued no instruction to end the machining of workpiece W ("NO" in step S104) and advances the program to step S106.

In step S106, control device 47 executes the machining of workpiece W in accordance with the machining program. The machining program includes one or multiple machining processing instructions (machining sub-steps) for machining (machining processing) workpiece W with cutting tool 43a and one or multiple non-machining processing instructions not to machine workpiece W, and control device 47 executes the machining processing and the non-machining processing by following the order programed in the machining program.

The machining processing includes cutting processing, grinding processing, and the like. The cutting processing includes turning processing in which a cutting tool is applied to rotating workpiece W to cut it by use of a lathe or a turning center, milling processing in which a rotating cutting tool is applied to fixed workpiece W to cut it by use of a machining center or a milling machine, boring processing in which a rotating drill is applied to fixed workpiece W to make a hole therein by use of a machining center or a drilling machine, and the like.

The machining processing instruction is an instruction to machine (or to execute machining processing on) workpiece W with cutting tool 43a (a machining tool). The machining program is a program for executing machining of workpiece W with cutting tool 43a (the machining tool), and has multiple machining processing instructions. For example, in the case that the machining program is an NC program made up of a G code (a G function) and the like, the machining program is made up of multiple blocks. The G code is a function to prepare a movement of cutting tool 43a, a rotation control of main spindle 42*a*, and the like. Each block is formed of one or multiple words. The word or words are represented by a combination of "an alphabetic character+a numeric character" and a combination of "an alphabetic character+a code". The block constitutes one unit of operation of the workpiece machining device, and one unit of operation includes a rapid feeding operation of the machining tool (a movement involving no machining), a movement (an operation) of the machining tool involving cutting, and the like. That is, the block includes a machining processing instruction which is an instruction to machine workpiece W by means of a movement (an operation) of the machining tool involving cutting. One machining program corresponds to one machining step, and each machining processing instruction corresponds to each machining sub-step which makes up a processing step.

The machining processing instruction is represented by, for example, a block including G codes such as "G1", which is a cutting feed command, "G2", "G3", which are an arc interpolation command, and the like. Here, the non-machining processing instruction is represented by, for example, a block including a G code such as "G0", which is a positioning command.

In step S108, control device 47 detects a machining load, which is a detectable physical amount which is a physical amount relating to machining of workpiece W and which can be detected, at each detection point of detection points which are disposed at predetermined intervals in a monitoring range for monitoring a state of the machining load (the detectable physical amount) (a detection section). Here, the machining load is detected as machining data (the machining data D is actual detection data which is actually detected.). Specifically speaking, the machining load is a load which is generated when workpiece W is cut (machined) by cutting tool 43*a*, and is a physical amount (machining resistance) which constitutes a resistant to machining. When used herein, the machining load means a magnitude of force exerted by and energy consumed by workpiece W and cutting tool 43*a* (a driven side) which exert a machining resistance on a drive side (in the present embodiment, the individual servo motors described above) and means, for example, a torque load exerted on a drive shaft.

In step S108, control device 47 can acquire a driving current of servo motor 42*d* for driving main spindle 42*a* from current sensor 42*e* which detects the driving current to thereby derive a machining load of servo motor 42*d* (a torque load exerted on main spindle 42*a* (a main spindle machining load)) from the detected driving current so acquired. For example, the machining load is derived as a machining load corresponding to a detected current by using a map or an arithmetic expression indicating a correlation between a driving current and a machining load. Here, this correlation is represented by a relationship in which the larger the machining load, the larger the driving current. An X-axis machining load, which is a machining load of servo motor 44*a*2, and a Z-axis machining load, which is a machining load of servo motor 44*b*2, can also be derived in the same manner as the manner in which the main spindle machining load is derived.

Here, a machining load is detected every predetermined short period of time (a sampling cycle of the present embodiment is several milliseconds (for example, 8 milliseconds)). The detection of a machining load is designed to be executed at predetermined multiple machining points in the series of machining programs (machining steps), and with the same machining program, a machining load can be detected at the same detection points for each workpiece W. That is, even in sub-steps corresponding to multiple machining processing instructions included in the machining program, a machining load is detected at predetermined multiple machining points, and with the same machining sub-step (the machining processing instruction), a machining load can be detected at the same machining points for each workpiece W. In this way, the machining point constitutes a detection point where to detect a machining load.

For example, a machining load is detected and stored at every machining point in every machining cycle. That is, machining points (sampling points) of machining data (sampling data) of a first time workpiece machining and machining points (sampling points) of sampling data of a second time workpiece machining and afterward are all the same machining points. The machining point is, for example, an arbitrary machining location in a machining step and hence in a machining sub-step, and may be a machining time, that is, an elapsed time since a machining start time.

Figure 11:
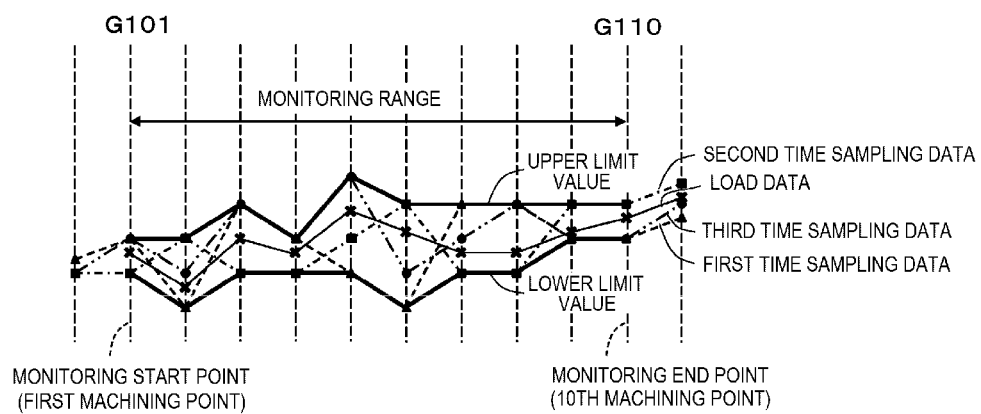
FIG. 11 is a diagram showing groups and upper and lower limit values of a monitoring range in the case that a resolution is "1".

For example, as shown in FIG. 11, load data (sampling data) of a first time workpiece machining are indicated by a triangular mark. The sampling data of the first time workpiece machining are connected by a dashed line. Sampling data in a second time workpiece machining are indicated by a square mark. The sampling data of the second time workpiece machining are connected by an alternate long and short dash line. Sampling data in a third time workpiece machining are indicated by a circular mark. The sampling data in the third time workpiece machining are connected by a chain double-dashed line. Load data of the immediately previous workpiece machining are indicated by an x-mark. The load data of the immediately previous workpiece machining are connected by a solid line. Upper and lower limit values of a monitoring range are each indicated by a thick solid line. In addition, in FIG. 11, every load data (including sampling data) is disposed on a machining point (indicated by a vertical dashed line). The machining point is, for example, an arbitrary machining location in a machining step, and may be an elapsed time since a machining start time. Also in FIGS. 12 and 13, load data and upper and lower limit values of monitoring ranges are illustrated in the same manner as in FIG. 11.

In step S110, control device 47 stores detected machining loads (actual detection data) in storage device 47*b* as a series of load data (machining data D (refer to FIG. 5)). Machining data D is stored at machining points (at sampling cycle intervals) for each workpiece W being machined or to be machined. In other words, load data of each workpiece W can be stored in association with the machining points. That is, machining corresponding data Da can be associated with a machining sub-step via a corresponding machining point and hence can be associated with a machining processing instruction which is made to correspond to the machining sub-step. In this way, machining data D has multiple machining corresponding data Da which can be associated with the individual machining processing instructions. For example, FIG. 5 shows a part of machining data D, and machining corresponding data Da is load data included in each of load monitoring ranges R1 to R14, and is load data generated when workpiece W is machined. In this way, the processing operations described in steps S106 to 110 are processing operations for sampling (detecting) load data.

(Automatic Monitoring Range Designation Processing)

Next, control device 47 automatically designates a monitoring range for monitoring a state of a machining load (a detectable physical amount) (step S114: an automatic designation section). Here, the monitoring range is a range for monitoring (determining) a state of a machining load (a detectable physical amount) along the machining steps. If load data falls within a range defined by upper and lower limits of the monitoring range (an upper and lower limit range), a machining load is in a normal state, whereas if the load data is out of the upper and lower limit range of the monitoring range, the machining load is in an abnormal state. When viewed in a direction along the machining steps, the monitoring range is a range that is defined as ranging from a monitoring start point (a monitoring start point) where a monitoring is started to a monitoring end point (a monitoring end point) where the monitoring is ended (this range may be referred to as a monitoring section depending on cases). When viewed in a direction along the magnitude of a machining load, the monitoring range is a range that is defined by the upper limit value and the lower limit value of the monitoring range (the upper and lower limit range).

Specifically speaking, control device 47 advances the post-machining program in step S110 to step S112, and determines whether flag F1 is 1. Since flag F1 stays at 0 from a start of machining of workpiece W to an end of automatic monitoring range designation, flag F1 is then "0", and hence, control device 47 determines "NO" in step S112 and advances the program to step S114. If the automatic monitoring range designation ends, flag F1 is set to "1" (step S118), and hence, control device 47 determines "YES" in step S112 and advances the program to step S120 and afterward by omitting processing operations in steps S114, 116.

Here, flag F1 is a flag to show whether the automatic monitoring range designation has ended, and when flag F1 is "1", flag F1 shows that the automatic monitoring range designation has ended, whereas when flag F1 is "0", flag F1 shows that the automatic monitoring range designation has not yet been ended. Here, flag F1 is set to "0" when there is issued a workpiece machining start instruction.

In addition, control device 47 determines in step S116 whether the automatic monitoring range designation has ended. If the automatic monitoring range designation has ended, control device 47 determines "YES" in step S116 and advances the program to step S118, where control device 47 sets flag F1 at 1. If the automatic monitoring range designation has not yet ended, control device 47 determines "NO" in step S116 and returns the program to step S114, where control device 47 executes the automatic monitoring designation.

Figure 9:
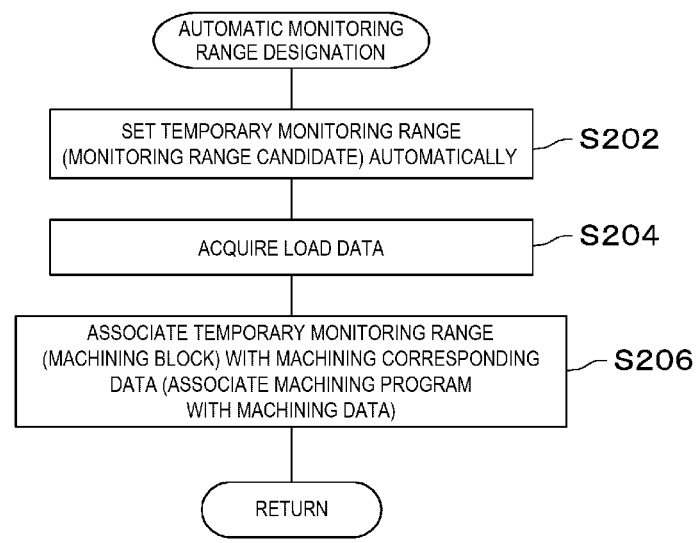
FIG. 9 is a flowchart showing a program (an automatic monitoring range designation subroutine) to be executed by control device 47 shown in FIG. 3.

Control device 47 executes an automatic monitoring range designation subroutine shown in FIG. 9 in step S114. At first, control device 47 automatically sets a temporary monitoring range, which is a candidate for a monitoring range, in step S202. That is, control device 47 sets a temporary monitoring range for each processing instruction (block) included in the machining program based on a processing instruction type thereof. Specifically speaking, if a block includes a machining processing instruction, control device 47 determines that a machining sub-process by the block (machining block) constitutes a temporary monitoring range, whereas if a block includes not a machining processing instruction but a non-machining processing instruction, control device 47 determines that a step by the block (non-machining block) cannot constitute a monitoring range. For example, if a block includes machining processing instructions of the G code (such as "G1", "G2", "G3", and the like), control device 47 can automatically set a machining sub-step corresponding to the block including those machining processing instructions as a temporary monitoring range.

Control device 47 acquires in step S204 load data (machining data) which is linked to (associated with) a machining point and hence a machining sub-step from storage device 47b. Then, control device 47 associates in step S206 a temporary monitoring range (a machining block) which is automatically set in advance with machining corresponding data Da. The temporary monitoring range (machining block) is linked to (associated with) the machining point, and the machining corresponding data Da is also linked to the machining point. As a result, control device 47 can associate the temporary monitoring range (machining block) with relevant machining corresponding data Da via the machining point. Hence, control device 47 can associate the machining program with the machining data. Thereafter, control device 47 ends the present subroutine.

(Automatic Setting of Upper and Lower Limit Values of Monitoring Range)

Figure 8:
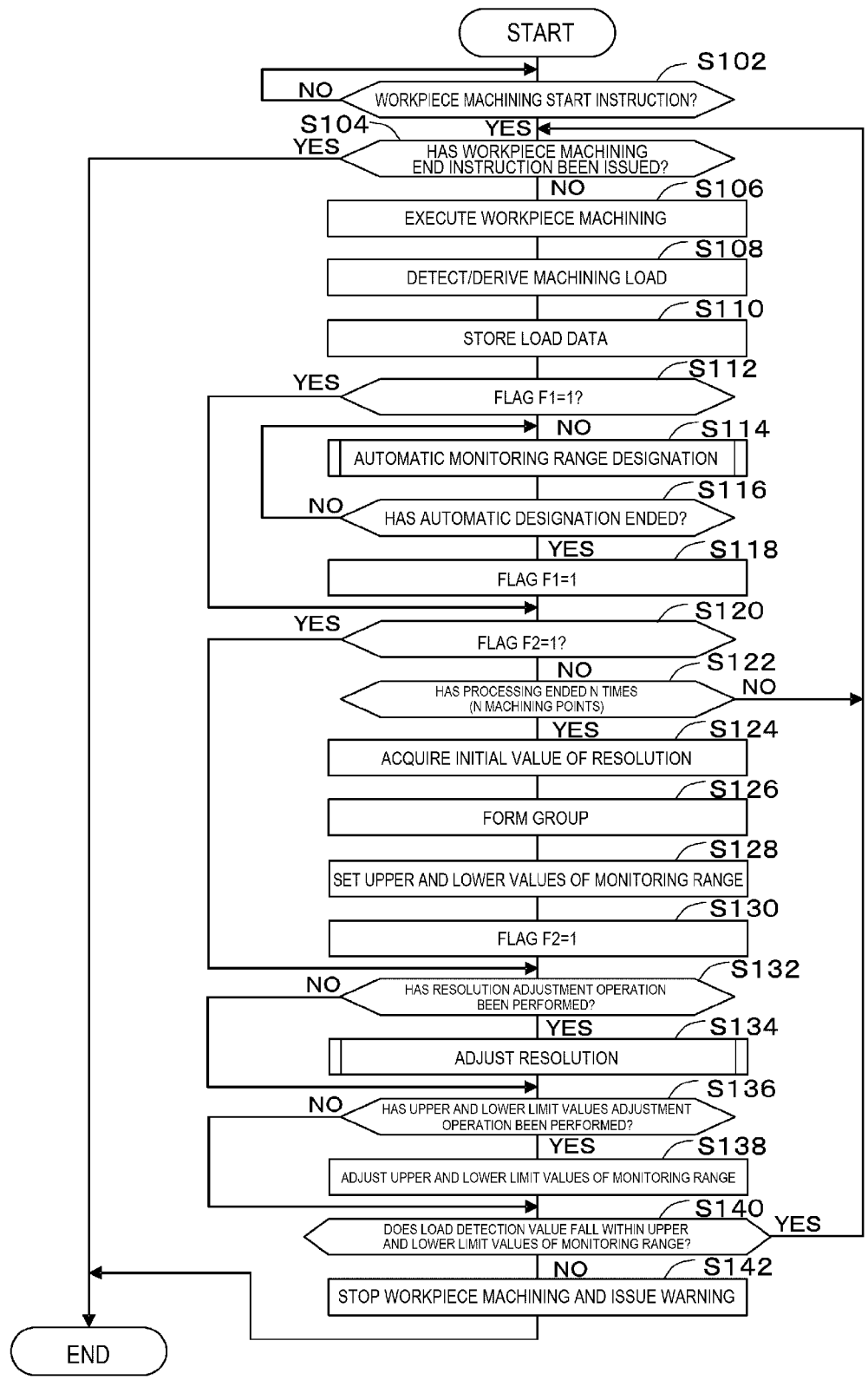
FIG. 8 is a flowchart showing a program to be executed by control device 47 shown in FIG. 3.

The description will proceed to step S120 and afterward shown in FIG. 8. That is, if the automatic monitoring range designation ends, control device 47 sets a resolution of the automatically designated monitoring range (initialization: steps S124, 126) and sets upper and lower limit values of the monitoring range (step S128). For example, control device 47 executes machining of workpiece W N times, and automatically sets upper and lower limit values of the monitoring range at an initialized resolution by using load data (actual detection data) of N times.

Specifically speaking, control device 47 executes workpiece machining from a first time to an Nth time, stores load data of each workpiece machining (determines "NO" in each of steps S120, 122), groups the load data of each workpiece machining based on the resolution (a default value (an initial value) of the resolution) in the monitoring range (in steps S124, 126 after having determined "NO", "YES" in steps S120, 122, respectively), and sets upper and lower limit values of the monitoring range using the load data of each workpiece machining (in step S128).

Control device 47 acquires in step S124 an initial value of the resolution from storage device 47b. In the present embodiment, the initial value of the resolution is set, for example, at "1". Then, control device 47 forms in step S126 a group based on (in accordance with) the initial value of the resolution so acquired. Here, the group is a group of machining points for detecting load data for use in setting upper and lower limit values of the monitoring range. That is, control device 47 forms multiple groups by dividing the load data (the actual detection data) of N times stored in storage device 47b in accordance with the resolution (that is, the number of detection points) set in advance in an interval from the monitoring start point (the monitoring start point) to the monitoring end point (the monitoring end point) of the monitoring range. Here, in the case that a resolution is the same as a section length of a monitoring range (in the case that a group length and a section length of a monitoring range are the same), the number of groups to be formed becomes one.

Control device 47 sets in step S128 an upper limit value and a lower limit value of a monitoring range for each group. Further, control device 47 displays in step S128 the upper and lower limit values of the monitoring range so set and load data (actual detection data) on data display section 110 of input/output device 47a. Here, load data to be displayed includes not only the load data of N times but also data (for example, detection data detected immediately previously) of a monitoring target, or may include all the previous load data. In addition, only the upper and lower limit values of the monitoring range may be made to be displayed without displaying the load data.

In the present embodiment, the "N times" described above is set at three times, and as shown in FIGS. 11 to 13, a monitoring range having load data (sampling data) of three times, immediately previous load data, and set upper and lower limit values is displayed on data display section 110. First time sampling data is indicated by a triangular mark+a dashed line, second time sampling data is indicated by a square mark+an alternate long and short dash line, third time sampling data is indicated by a circular mark+a chain double-dashed line, and immediately previous detection data is indicated by an x mark+a solid line.

To describe this in detail, for example, control device 47 sets an upper limit value and a lower limit value of the monitoring range for each group of groups formed in step S126 described above (the group forming section) based on load data (actual detection data) of N times which belongs to the relevant each group (a setting section). In the present embodiment, control device 47 sets, for each group, a maximum value in the actual detection data (load detection value) of N machining points as an upper limit value (a machining point upper limit value) and a minimum value of the same actual data as a lower limit value (a machining point lower limit value) of the relevant machining points. Next, the control device 47 sets a maximum value in the machining point upper limit values in the group as an upper limit value of the group (a group upper limit value), and sets a minimum value in the machining point lower limit values in the group as a lower limit value of the group (a group lower limit value).

In setting upper and lower limit values of the monitoring range, the present description is not limited to the method described above which uses the maximum and minimum of the load data, and hence, other methods may be used in which load data of N times is used. For example, an average value of the load data may be taken, or a value resulting from offsetting the average value may be used.

As shown in FIG. 11, in the case that the resolution (or the default value of the resolution) is "1", a group is made up of one machining point. That is, a group is provided for each machining point, and an upper limit value and a lower limit value of a monitoring range are set for each machining point. First group G101 is made up of a first machining point which is a monitoring start point, and 10th group G110 is made up of a 10th machining point which is a monitoring end point. Similarly, second to ninth groups are made up of second to ninth machining points, respectively.

Figure 12:
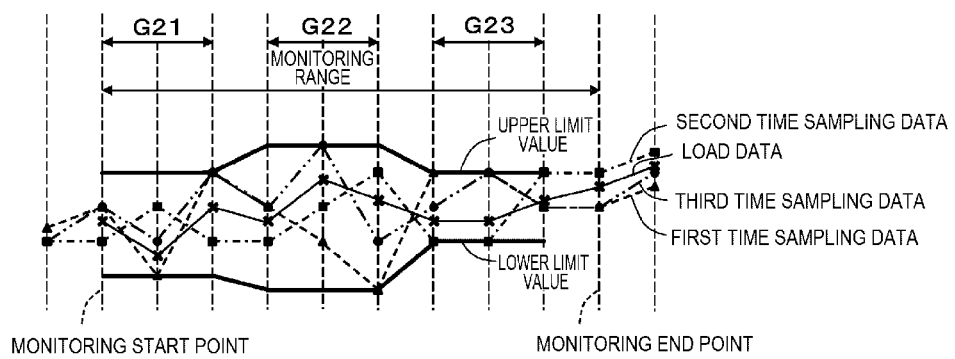
FIG. 12 is a diagram showing groups and upper and lower limit values of a monitoring range in the case that a resolution is "3".

In addition, as shown in FIG. 12, in the case that the resolution (or the default value of the resolution) is "3", a group is made up of three machining points. That is, a group is provided every three machining points. In each group, a group upper limit value is set as an upper limit value of a monitoring range, and a group lower limit value is set as a lower limit value of the monitoring range.

Specifically speaking, first group G21 is made up of a first machining point, which is a monitoring start point, to a third machining point, second group G22 is made up of a fourth machining point to a sixth machining point, and third group G23 is made up of a seventh machining point to a ninth machining point. An upper limit value of first group G21 is an upper limit value of the third machining point, and a lower limit value of first group G21 is a lower limit value of the second processing point. An upper limit value of second group G22 is an upper limit value of the fifth machining point, and a lower limit value of second group G22 is a lower limit value of the sixth machining point. An upper limit value of third group G23 is upper limit values of the seventh to ninth machining points, and a lower limit value of third group G23 is lower limit values of the seventh to eighth machining points. As a result, an upper limit value of a monitoring range is formed by a group upper limit value of first to third groups G21 to 23, while a lower limit value of the monitoring range is formed by a group lower limit value of first to third groups G21 to 23.

Figure 13:
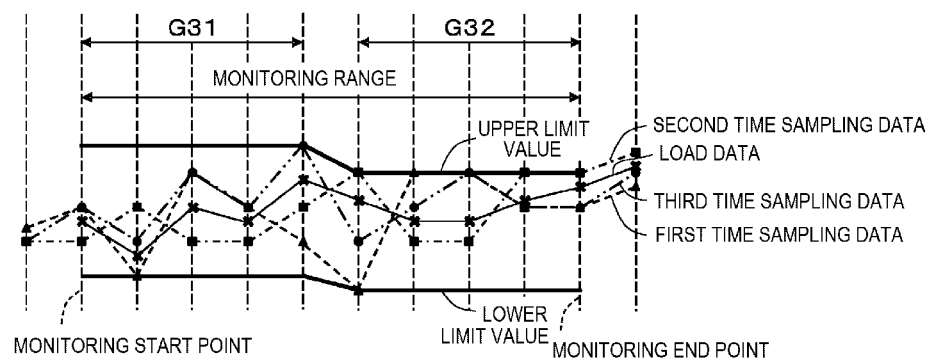
FIG. 13 is a diagram showing groups and upper and lower limit values of a monitoring range in the case that a resolution is "5".

In addition, as shown in FIG. 13, in the case that the resolution (or the default value of the resolution) is "5", a group is made up of five machining points. That is, a group is provided every five machining points. In each group, a group upper limit value is set as an upper limit value of a monitoring range, and a group lower limit value is set as a lower limit value of the monitoring range.

Specifically speaking, first group G31 is made up of a first machining point, which is a monitoring start point, to a fifth machining point, and second group G32 is made up of a sixth machining point to a tenth machining point. An upper limit value of first group G31 is an upper limit value of the fifth machining point, and a lower limit value of first group G31 is a lower limit value of the second machining point. An upper limit value of second group G32 is upper limit values of the sixth to the tenth machining points, while a lower limit value of second group G32 is a lower limit value of the sixth machining point. As a result, an upper limit value of the monitoring range is formed by a group upper limit value of first to second groups G31 to 32, while a lower limit value of the monitoring range is formed by a group lower limit value of first to second groups G21 to 32.

At a machining point where a group upper limit value and a machining point upper limit value coincide with each other, an upper limit value resulting from offsetting upper limit values over a predetermined range including the relevant machining point by a predetermined value (an offset upper limit value) may be set as an upper limit value of the relevant machining point. At a machining point where a group lower limit value and a machining point lower limit value coincide with each other, a lower limit value resulting from offsetting lower limit values over a predetermined range including the relevant machining point by a predetermined value (an offset lower limit value) may be set as a lower limit value of the relevant machining point. As a result, at the machining point where the group upper limit value and the machining upper limit value coincides with each other, the sensitivity of monitoring determination of a machining load is adjusted by a predetermined value, whereby the monitoring of a machining load can be implemented appropriately. In addition, although the group is made to be set based on the monitoring start point, the group may be made to be set based on a machining point other than the monitoring start point.

In addition, control device 47 sets flag F2 at 1 in step S130. Flag F2 is a flag showing whether upper and lower limit values of a monitoring range are set at a default resolution by use of load data of N times, and flag F2 shows that upper and lower limit values of a monitoring range are set at a default resolution when flag F2 is "1", while when flag F2 is "0", flag F2 shows that upper and lower limit values of the monitoring range are not set at the default resolution. Here, when there is issued an instruction to start machining a workpiece, flag F2 is set at "0".

It is determined in step S120 whether flag F2 is 1. Since flag F2 stays "0" from a point in time when workpiece W is started to be machined to a point in time when upper and lower limit values of a monitoring range are set, control device 47 determines "NO" in step S120. If the upper and lower limit values of the monitoring range have been set, flag F2 becomes "1" (step S130), and control device 47 then determines "YES" in step S120 and advances the program to step S132 and afterward by omitting processing operations in step S122 to 130.

In addition, control device 47 determines in step S122 whether the machining of a workpiece, the detection of a machining load and the storage of load data have all been executed N times. Control device 47 determines that the workpiece machining and the other processing operations have not yet ended during a time period after a first time workpiece machining starts and before an Nth time workpiece machining ends ("NO" in step S122) and returns the program to step S104. If the Nth time workpiece machining ends, control device 47 determines that the workpiece machining and the other processing operations have been completed N times ("YES" in step S122) and advances the program to step S124.

(Adjustment of Resolution and Upper and Lower Limit Values of Monitoring Range by Manual Operations by Operator)

Next, control device 47 manually adjusts (sets) the resolution of the monitoring range whose upper and lower limit values are automatically set in step S128, and manually adjusts (sets) the upper and lower limit values of the monitoring range which are automatically set in step S128. As a result, the operator can more easily adjust the upper and lower limit values of the monitoring range by manual operations.

(Adjustment of Resolution of Monitoring Range)

Specifically speaking, control device 47 can adjust (change) the resolution of the monitoring range that has already been set by following a resolution adjustment operation by the operator (step S134: monitoring range resolution adjustment section). In the case that the operator thinks it necessary to adjust the resolution of the monitoring range, the operator performs a resolution adjustment operation to adjust the resolution of the monitoring range. In the case that the operator thinks it unnecessary to adjust the resolution of the monitoring range, the operator performs an operation informing that the resolution adjustment operation is unnecessary (an adjustment-unnecessary operation).

The resolution adjustment operation is an operation to be performed by the operator when the operator selects an axis including a monitoring range for which the operator wants to adjust the resolution (resolution adjustment), when the operator selects a monitoring range for which the operator wants to adjust the resolution, or when the operator scales up or down the resolution of the monitoring range so selected. Specifically speaking, in the case that the operator selects an axis for which the operator wants to adjust the resolution, the operator operates display axis selection key 128. In the case that the operator selects individually and separately a monitoring range (a machining sub-step) for which the operator wants to adjust the resolution, the operator operates any one of display position moving key 129, monitoring range leftward moving key 131 and monitoring range rightward moving key 133. Here, the operator may select monitoring ranges for which the operator wants to adjust the resolution as a package or integrally.

In the case that the operator scales up the resolution, the operator operates resolution scale-up key 146. On the other hand, in the case that the operator scales down the resolution, the operator operates resolution scale-down key 145. Here, in the case that the operator scales up or down the resolution, the operator can manually input a resolution scalar after (or at the same time as) the operator operates resolution scale-up key 146 and/or resolution scale-down key 145. In addition, in scaling up (or down) the resolution, the resolution can also be scaled up (down) by a predetermined amount every time the operator operates resolution scale-up key 146 (or resolution scale-down key 145). In this way, the resolution, that is, the number of detection points can be set differently in a changeable fashion (can be set) by the operator performing an input operation into input/output device 47*a*. In addition, in the case that the operator saves the adjusted resolution, the operator operates save key 126. As a result, the adjusted resolution (the scalar of the adjusted resolution) can be stored in storage device 47*b*.

Here, the resolution of all the monitoring axes and all the monitoring locations can also be adjusted as a package or integrally without designating specifically a monitoring axis and a monitoring location. In this case, the operator switches on the resolution setting key for an integral adjustment (described above) to display a screen where to input (adjust) a scalar (the scalar) of the resolution and operates the input keys (described above) for inputting a scalar of the resolution in a resolution input window on the screen to input a desired scalar of the resolution. This series of operations constitutes a resolution adjustment operation.

If the resolution adjustment operation described above is not performed on the monitoring range, control device 47 determines "NO" in step S132 and advances the program to step S136 and afterward. On the other hand, if the resolution adjustment operation has been performed on the monitoring range, control device 47 determines "YES" in step S132, changes (adjusts) the whole or a part of the resolutions of the monitoring range in accordance with the resolution adjustment operation so performed, and causes the changed (adjusted) monitoring range to be displayed (step S134). Control device 47 can set in step S134 the resolution of the monitoring range which has been initialized or reset before based on the resolution adjustment operation (a setting section). Thereafter, control device 47 advances the program to step S136.

Figure 10:
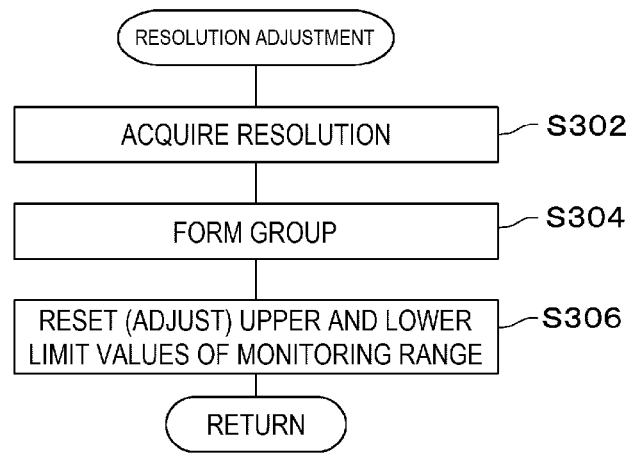
FIG. 10 is a flowchart showing a program (a resolution adjusting subroutine) to be executed by control device 47 shown in FIG. 3.

Specifically speaking, control device 47 executes a resolution adjustment subroutine shown in FIG. 10 in step S134. First of all, control device 47 acquires in step S302 the resolution (the scalar of the resolution) which is set and stored as a result of the operator performing the resolution adjustment operation before from storage device 47*b* in a similar manner to the manner adopted in step S124 described above.

Control device 47 forms in step S304 a group in the same manner as the manner adopted in step S126 described above. Then, in step S306, by adopting the same manner as that adopted in step S128 described above, control device 47 resets (adjusts) the upper and lower limit values of the monitoring range and causes the upper and lower limit values of the monitoring range so reset and the load data (the actual detection data) to be displayed on data display section 110 of input/output device 47*a*. This enables the upper and lower limit values of the monitoring range which have already been set to be adjusted (changed) in accordance with the resolution which is changed manually by the operator. In other words, the upper and lower limit values of the monitoring range can be adjusted (changed) by changing the resolution, that is, the number of detection points in accordance with the input operation of the operator. Thereafter, control device 47 ends the present subroutine.

(Adjustment of Upper and Lower Limit Values of Monitoring Range)

In addition, control device 47 can adjust the upper and lower limit values of the monitoring range which have already been set in accordance with the upper and lower limit values adjustment operation by the operator (step S138: a monitoring range upper and lower limit values adjustment section). In the case that the operator thinks it necessary to adjust the upper and lower limit values of the monitoring range, the control device 47 performs the upper and lower limit values adjustment operation to adjust the upper and lower limit values of the monitoring range. In the case that the operator thinks it unnecessary to adjust the monitoring range, the operator performs a processing operation showing that the adjustment operation is unnecessary (an adjustment unnecessary operation).

The upper and lower limit values adjustment operation is an operation to be performed to select an axis including a monitoring range which the operator wants to adjust, select a monitoring range which the operator wants to adjust, designate a range (an adjustment range, a designation range) in the monitoring range which the operator wants to adjust, scales up or down the upper limit value of the designation range (and hence the monitoring range), or scales up or down the lower limit value of the designation range.

Specifically speaking, in the case that the operator selects an axis which the operator wants to adjust, the operator operates display axis selection key 128. In the case that the operator selects a monitoring range (a machining sub-step) which the operator wants to adjust, the operator operates any one of display position moving key 129, monitoring range leftward moving key 131, and monitoring range rightward moving key 133.

In the case that the operator designates a start position of a range (an adjustment range) where to edit (adjust) the upper limit value and/or the lower limit value in the monitoring range of load data constituting an edit (adjustment) target, the operator operates adjustment (editing) range start position designation key 134. In the case that the operator designates an end position of the adjustment range, the operator operates adjustment (editing) range end position designation key 135.

In the case that the operator scales up the upper limit value, the operator operates upper limit value scale-up key 136 or upper limit value maximization key 140. In the case that the operator scales down the upper limit value, the operator operates upper limit value scale-down key 137 or upper limit value minimization key 141. In the case that the operator scales up the lower limit value, the operator operates lower limit value scale-up key 138 or lower limit value minimization key 142. In the case that the operator scales down the lower limit value, the operator operates lower limit value scale-down 139 or lower limit value maximization key 143. Here, in the case that the operator saves the edited monitoring range, the operator operates save key 126.

If control device 47 determines that no upper and lower limit values adjustment operation described above has been performed on the monitoring range, control device 47 determines "NO" in step S136 and advances the program to step S140 and afterward. On the other hand, if control device 47 determines that the upper and lower limit values adjustment operation has been performed on the monitoring range, control device 47 determines "YES" in step S136, then, changes (adjusts) the whole or a part of the upper and lower limit values in the monitoring range in accordance with the adjustment operation, and causes the changed (adjusted) monitoring range to be displayed (step S138). Control device 47 can set in step S138 the upper and lower limit values of the monitoring range which have been initialized or rest before based on the upper and lower limit values adjustment operation (a setting section). Thereafter, control device 47 advances the program to step S140.

Control device 47 determines in step S140 whether a load detection value which is a detected machining load falls within the range of the upper and lower limit values of the monitoring range. At this time, the upper and lower limit values of the monitoring range are the initialized upper and lower limit values (step S128), the upper and lower limit values which are rest by changing the resolution (step S134), or the upper and lower limit values which are set by performing the upper and lower limit values adjustment operation (step S138). If control device 47 determines that the load detection value falls within the range of the upper and lower limit values of the monitoring range ("YES" in step S140), control device 47 returns the program to step S104 and executes the series of processing operations in step S104 to S110 described above by following the order programmed in the machining program. If control device 47 determines that the load detection value does not fall within the range of the upper and lower limit values of the monitoring range ("NO" in step S140), control device 47 advances the program to step S142 and afterward, issues a warning while stopping the machining of workpiece W (step S142), and thereafter ends the present flowchart.

Here, the machining (cutting) of workpiece W by the machine tool (drilling-milling module 30B) described above can also be controlled by following the flowchart shown in FIG. 8 in the same manner as that in which the machining or processing operations by lathe module 30A are controlled. In this case, the control is performed by control device 57 instead of control device 47. In addition, a configuration may be adopted in which a monitoring range needing monitoring can be selected by a manual operation by the operator.

Functions and Advantageous Effects of Embodiment

The workpiece machining device (lathe module 30A, drilling-milling module 30B) according to the embodiment described heretofore is the workpiece machining device for executing machining of workpiece W using cutting tools 43a, 52b (the machining tool), including the detection section (control devices 47, 57: step S108) configured to detect a machining load (a detectable physical amount) which is a physical amount relating to the machining of workpiece W and which can be detected at each of the detection points which are set at the predetermined intervals in the monitoring range for monitoring the state of the machining load; storage devices 47b, 57b configured to store machining data which is actual detection data which is actually detected in step S108; the group forming section (control devices 47, 57: steps S126, 304) configured to form one or multiple groups by dividing the actual detection data stored in storage devices 47b, 57b in accordance with the number of detection points (resolution) which are set in advance in the interval from the monitoring start point to the monitoring end point of the monitoring range; and the setting section (control devices 47, 57: steps S128, 306) configured to set an upper limit value and a lower limit value of the monitoring range for each group of the groups formed in steps S126, 304 based on the actual detection data belonging to the each group.

With this configuration, the upper limit value and the lower limit value of the monitoring range can be set for each group of the groups formed in accordance with the number of detection points (resolution) which are set in advance in the interval from the monitoring start point to the monitoring end point of the monitoring range. That is, the upper and lower limit values of the monitoring range can be set based on the number of detection points (resolution) and the actual detection data from the monitoring start point to the monitoring end point of the monitoring range. As a result, in lathe module 30A and drilling-milling module 30B, the upper and lower limit values of the monitoring range can be set more simply and easily. In addition, since the acquired machining data can be grouped at a desired detection point, various types of monitoring from severe monitoring to simple monitoring can be easily performed in accordance with the user's needs.

In addition, the number of detection points (resolution) can be set and changed by the operator performing input operations into input devices 47a, 57a. With this configuration, the number of detection points is a parameter contributing to the division of monitoring sections in the monitoring range, and since the number of detection points can be changed by the input operation of the operator, the adjustment (change) of the upper and lower limit values of the monitoring range can be executed simply and in an ensured fashion by the input operation of a detection point number by the operator.

Here, in the embodiment described heretofore, while the detection of the machining load, the setting of the monitoring range, and the adjustment of the monitoring range are all made to be executed while the machining step of workpiece W is being operated, a configuration may be adopted in which a trial operation of machining of the workpiece is executed before the machining step, the detection of a machining load and the setting of the monitoring range are executed during the trial operation, and the adjustment of the monitoring range is executed during the trial operation or in the machining step. In this case, the setting section described above sets the monitoring range for monitoring the state of the detectable physical amount along the machining step based on the actual detection data which is actually detected by the detection section during the trial operation of the machining step.

In addition, in the embodiment described above, while the cutting tool is used as the machining tool, other machining tools for machining workpiece W may be used. In addition, while the machining load is used as the detectable physical amount, another physical amount may be used which relates to the machining of workpiece W and which can be detected.

REFERENCE SIGNS LIST

30A . . . lathe module (workpiece machining device), 30B . . . drilling-milling module (workpiece machining device), 43a, 52b . . . cutting tool (machining tool), 47, 57 . . . control device (detection section, setting section, group forming section), S108 step S108 (detection section), S126, 304 . . . steps S126, 304 (group forming section), S128, 306 . . . steps S128, 306 (setting section), W . . . workpiece

The invention claimed is:

1. A workpiece machining device for executing machining of a workpiece using a machining tool, comprising:
    processing circuitry configured to:
        detect a detectable physical amount that is a physical amount relating to the machining of the workpiece and that can be detected at each of detection points that are set at predetermined intervals in a monitoring range for monitoring a state of the detectable physical amount;
        store, in a memory, machining data that is actual detection data that is actually detected by the processing circuitry;
        form a plurality of groups by dividing the actual detection data in accordance with a number of the detection points that are set in advance in an interval from a monitoring start point to a monitoring end point of the monitoring range;
        set an upper limit value and a lower limit value of the monitoring range for each group of the plurality of groups based on the actual detection data belonging to the each group;
        determine whether a load detection value that is a detected machining load falls within the range of the upper and lower limit values of the monitoring range; and
        in response to determining that the load detection value does not fall within the range of the upper and lower limit values of the monitoring range, stop the machining of the workpiece and issue a warning.

2. The workpiece machining device according to claim 1, wherein the number of detection points can be set and changed by an input operation performed on an input device by an operator.

* * * * *